US009363280B1

(12) United States Patent
Rivlin et al.

(10) Patent No.: US 9,363,280 B1
(45) Date of Patent: Jun. 7, 2016

(54) SYSTEM AND METHOD OF DETECTING DELIVERY OF MALWARE USING CROSS-CUSTOMER DATA

(71) Applicant: FireEye, Inc., Milpitas, CA (US)

(72) Inventors: Alexandr Rivlin, Los Gatos, CA (US); Divyesh Mehra, San Jose, CA (US); Henry Uyeno, Sunnyvale, CA (US); Vinay Pidathala, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 14/466,898

(22) Filed: Aug. 22, 2014

(51) Int. Cl.
*G06F 11/00* (2006.01)
*H04L 29/06* (2006.01)

(52) U.S. Cl.
CPC ........ *H04L 63/1416* (2013.01); *H04L 63/1441* (2013.01)

(58) Field of Classification Search
CPC .............. H04L 63/145; H04L 63/1466; H04L 63/1475; H04L 63/16; H04L 63/20; H04L 63/1416; H04L 63/1425; H04L 63/1433; H04L 63/1441; H04L 63/15
USPC ................................ 713/187, 188; 726/22–26
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,440,723 A | 8/1995 | Arnold et al. | |
| 5,490,249 A | 2/1996 | Miller | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,108,799 A | 8/2000 | Boulay et al. | |
| 6,118,382 A | 9/2000 | Hibbs et al. | |
| 6,269,330 B1 | 7/2001 | Cidon et al. | |
| 6,272,641 B1 | 8/2001 | Ji | |
| 6,279,113 B1 | 8/2001 | Vaidya | |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Adobe Systems Incorporated, "PDF 32000-1:2008, Document management—Portable document format—Part1:PDF 1.7", First Edition, Jul. 1, 2008, 756 pages.

(Continued)

*Primary Examiner* — Hosuk Song
(74) *Attorney, Agent, or Firm* — Rutan & Tucker, LLP; William W. Schaal

(57) ABSTRACT

According to one embodiment, a computerized method comprises receiving a set of indicators of compromise (IOCs) associated with a known malware of a first message type from a first source and receiving one or more IOCs (IOC(s)) from a second source that is different from the first source. Thereafter, a determination is made as to whether the received IOC(s) from the second source correspond to the set of IOCs received from the first source. If so, information associated with at least the set of IOCs is used to locate a malware of the first message type that is undetected at the second source.

48 Claims, 8 Drawing Sheets

(56) References Cited

U.S. PATENT DOCUMENTS

| | | | |
|---|---|---|---|
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | S.o slashed.rhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,895,657 B2 * | 2/2011 | Bennett ................ G06F 21/562 726/22 |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,056,115 B2 * | 11/2011 | Treinen ............... H04L 63/1416 709/206 |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,496 B2 * | 10/2012 | Bennett ............... H04L 63/1416 726/23 |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |

(56) References Cited

U.S. PATENT DOCUMENTS

| | | |
|---|---|---|
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,756,693 B2 * | 6/2014 | Dube .................. G06F 21/564 713/188 |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |

(56) References Cited

U.S. PATENT DOCUMENTS

| | | |
|---|---|---|
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0054278 A1 | 3/2010 | Stolfo et al. |
| 2010/0115621 A1 | 5/2010 | Staniford et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0281541 A1 | 11/2010 | Stolfo et al. |
| 2010/0281542 A1 | 11/2010 | Stolfo et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |

(56) References Cited

U.S. PATENT DOCUMENTS

| | | |
|---|---|---|
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0033261 A1 | 1/2014 | Evans et al. |
| 2014/0053260 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0328204 A1 | 11/2014 | Klotsche et al. |
| 2014/0337836 A1 | 11/2014 | Ismael |
| 2014/0351935 A1 | 11/2014 | Shao et al. |
| 2015/0096025 A1 | 4/2015 | Ismael |

FOREIGN PATENT DOCUMENTS

| | | |
|---|---|---|
| WO | 02/23805 A2 | 3/2002 |
| WO | 02/006928 A2 | 8/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2013/067505 A1 | 5/2013 |

OTHER PUBLICATIONS

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Clark, John, Sylvian Lebianc,and Scott Knight. "Risks associated with usb hardware tuilan devices used by insiders." Systems Conference (SysCon), 2011 IEEE International. IEEE, 2011.
FireEye Maiware Analyse & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye.Inc., May 2011.
Gibier, Clint, et al. AndroidLeaks: automatically detecting potential privacy leaks in android applications on a large scale. Springer Berlin Heidelberg, 2012.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek-    .com/microsofts-honeymonkeys-show-patchinig-wi/167600716 [retrieved on Sep. 29, 2014].
HengYin et al, Panorama: Capturing System-Wide Information Flow for Maiware Detection and Analysis, Research Showcase @ CMU, Carnegie Mellon University, 2007.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational Intelligence and Security (CIS), 2011 Seventh International Conference on IEEE, 2011.
Kevin A Rouridy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Leading Colleges Select FireEye to Stop Malware-Related Data Breaches, FreEye Inc., 2009.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Mori, Detecting Unknown Computer Viruses, 2004, Springer-Verlag Berlin Heidelberg.
Oberheide et al., CloudAV.sub.-N-Version Antivirus in the Network Cloud, 17th USENIX Security Symposium USENIX Security '08 Jul. 28-Aug. 1, 2008 San Jose, CA.
Wahid et al., Characterising the Evolution in Scanning Activity of Suspicious Hosts, Oct. 2009, Third International Conference on Network and System Security, pp. 344-350.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library available at, http://ieeexplore.ieee.org/xpl/articleDetails.jsp?reload=true&arnumbe-r=990073, (Dec. 7, 2013).
Abdullah et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
AltaVista Advanced Search Results. "attack vector identifier". Http://www.altavista.com/web/results?ltag=ody&pg=aq &aqmode=aqa=Event+Orch-estrator . . . , (Accessed on Sep. 15, 2009).
AltaVista Advanced Search Results. "Event Orchestrator". Http://www.altavista.com/web/results?ltag=ody&pg=aq &aqmode=aqa=Event+Orch-esrator . . . , (Accessed on Sep. 3, 2009).
Aura, Tuomas, "Scanning electronic documents for personally identifiable information", Proceedings of the 5th ACM workshop on Privacy in electronic society, ACM, 2006.
Baecher, "The Nepenthes Platform: An Efficient Approach to collect Malware", Springer-verlag Berlin Heidelberg, (2006), pp. 165-184.
Baidi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al. "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Cohen, M.I. , "PyFlag—An advanced network forensic framework", Digital investigation 5, Elsevier, (2008), pp. S112-S120.
Costa, M. , et al. "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Micoarchitecture, Portland, Oregon, (Dec. 2004).
Deutsch, P. , "Zlib compressed data format specification version 3.3" RFC 1950, (1996).

(56) References Cited

OTHER PUBLICATIONS

Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Menke Kaeo, Designing Network Security ("Kaeo"), (2005).
Filiol, Eric, et al "Combinatorial Optimisation of Worm Propagation on an Unknown Network", International Journal of Computer Science 2.2 (2007).
Gael, et al., Reconstructing System State for Intrusion Analysis, Apr. 2001 SIGOPS Operating Systems Review, vol. 42 Issue 3, pp. 21-28.
Hjelmvik, Erik;, "Passive Network Security Analysis with NetworkMiner,", (IN)Secure, Issue 18, (Oct. 2008), pp. 1-100.
IEEE Xplore Digital Library Sear Results for "detection of unknown computer worms". Http//ieeexplore.ieee.org/searchresult.jsp?SortField=Score&SortOrder=desc- &ResultC . . . (Accessed on Aug. 28, 2009).
Kaeo, Merike "Designing Network Security", ("Kaeo"), (Nov. 2003).
Kim, H. et al., "Autograph: Toward Automated, Distributed Worm Signature Detection", Proceedings of the 13th Usenix Security Symposium (Security 2004), San Diego, (Aug. 2004), pp. 271-286.
Krasnyansky, Max, et al., Universal TUN/TAP driver, available at https://www.kernel.org/doc/Documentation/networking/tunlap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Technique", NU Security Day, (2005), 23 pages.
Lijpenstam, Michael, et al., "Simulating Realistic Network Traffic for Worm Warning System Design and Testing", Institute for Security Technology studies, Dartmouth College ("Liljenstam"), (Oct. 27, 2003).
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurty12/sec12-final107.pdf [retrieved on Dec. 15, 2014].
Marchette David . "Computer Intrusion Detection and Network Monitoring: A Statistical Viewpoint", ("Marchette"), (2001).
Margolis P.E. "Random House Webster's 'Computer & Internet Dictionary 3rd Edition'", ISBN 0375703519, (Dec. 1998).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A. et al., ""Analyzing and exploiting network behaviors of malware."", Security and Privacy in Communication Networks. Springer Berlin Heidelberg, 2010. 20-34.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al, "Dynamic Taint Analysis for Automatic Detection, Analysis, and Signature Generation of Exploits on Commodity Software", In Proceedings of the 12th Annual Network and Distrbuted System Security, Symposium (NDSS '05), (Feb. 2005).
Newsome, J., et al., "Polygraph: Automatically Generating Signatures for Polymorphic Worms" In Proceedings of the IEEE Symposium on Security and Privacy, (May 2005).
Nojiri, D. et al., "Cooperation Response Strategies for Large Scale Attack Mitigation", DARPA Information Survivability Conference and Exposition, vol. 1, (Apr. 22-24, 2003), pp. 293-302.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
US 8,171,553 filed Apr. 20, 2006, Inter Parties Review Decision dated Jul. 10, 2015.
US 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagtion to Defeat Malicious Mobile Code", ACSAC Conference, Las Vegas, NV, USA, (Dec. 2002), pp. 1-9.

\* cited by examiner

SYSTEM AND METHOD OF DETECTING DELIVERY OF MALWARE USING CROSS-CUSTOMER DATA

FIELD

Embodiments of the disclosure relate to the field of cybersecurity. More specifically, embodiments of the disclosure relate to a system and method for conducting a predictive analysis, based on information from a first customer, as to when indicators of compromise (IOCs) experienced by a second customer are caused by receipt of an undetected malicious electronic message.

GENERAL BACKGROUND

Currently, there exist a number of malware delivery techniques. A commonly used malware delivery technique involves the transmission of a malicious electronic mail (email) message to a computer or device controlled by a targeted user. Based on user activity, the malicious email message causes the computer to become infected. More specifically, the malicious email message may be structured to lure the targeted user to select a Uniform Resource Locator (URL) within the malicious email message which, upon selection, establishes communications with a web server that, unbeknownst to the user, is malicious. Thereafter, malware is uploaded and sensitive information may be subsequently downloaded from the infected computer.

For the last few years, anti-virus and email filtering industries have developed tools and techniques to identify and isolate potentially infected email messages. However, these traditional tools and techniques are not effective in detecting certain types of advanced, malicious email messages. To address this detection gap, one type of security appliance has been solely developed (and is currently available) to analyze an email message and determine whether the email message is likely infected with malware. In particular, this email analytic appliance analyzes incoming email messages, namely its header, content, links and attachments, in order to identify the presence of malware. Upon discovery of a malicious email message, the email analytic appliance alerts security personnel to quarantine the malicious email message and cleanse the infected computer.

Many customers deploy dedicated email analysis appliances as well as network monitoring appliances. However, some customers do not operate dedicated email analytic appliances. Instead, most of these customers simply deploy one or more security appliances that are configured to monitor network communications with one or more network devices to identify indicators of compromise (IOCs), namely malicious behaviors that suggest the presence of malware on a particular network device or particular network devices. While these types of security appliances are able to identify the presence of malware on a particular computer, they are not configured to analyze email messages for the presence of malware within these messages. As a result, without an email analytic appliance, a customer has no ability to reliably prevent delivery of malicious to targeted victim of attack. Protection against malicious email messages becomes more complex as the messages may lay dormant in the user's inbox for days or even weeks. This lack of detection has prolonged adverse effects on network security as subsequent malicious attacks may persist months later as long as the malicious email message is stored at an email server of the enterprise network and/or stored locally at a computer having access to the network.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
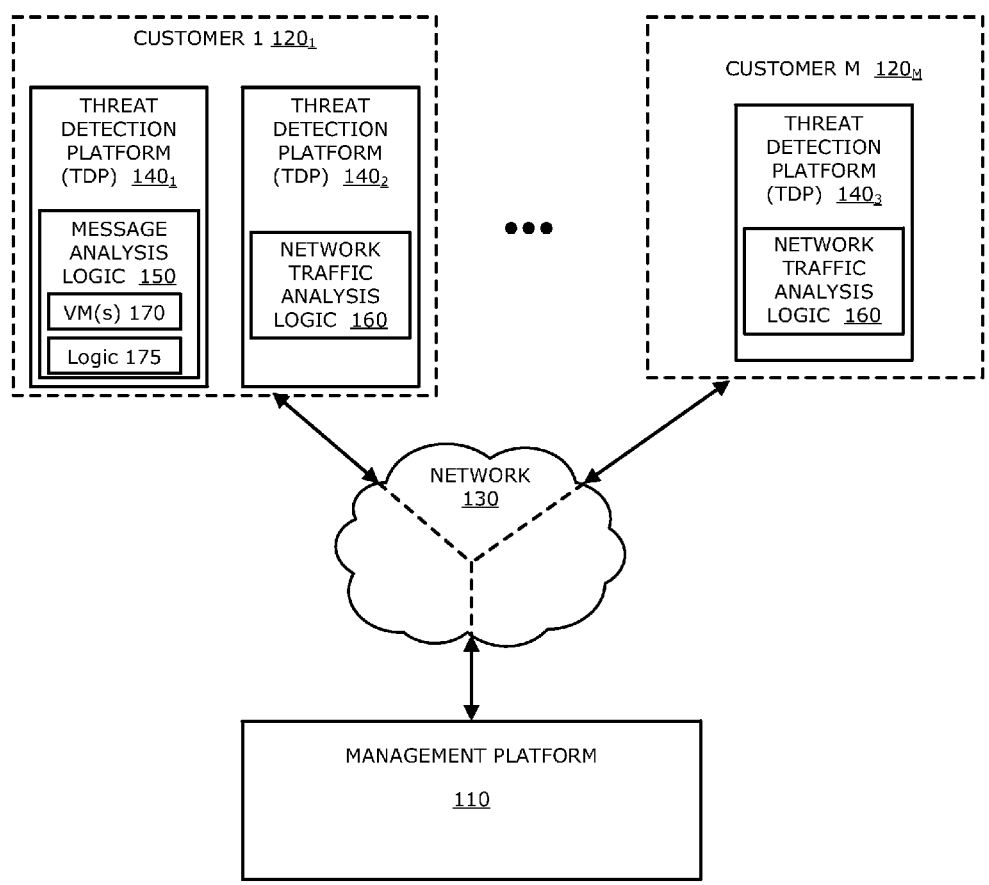
FIG. 1 is an exemplary block diagram of a communication network 100 deploying an embodiment of the invention.

Various embodiments of the disclosure relate to a platform and method for determining whether one or more indicators of compromise (IOCs) detected by a second customer (e.g., second source) have been caused by receipt of a malicious electronic message, even when no malicious electronic message has been directly observed by the second customer. More specifically, the platform is configured to conduct a predictive analysis that determines, based on a sufficient correspondence between IOCs detected by the second customer and IOCs associated with a particular malicious electronic message as detected and/or observed by one or more customers different than the second customer (e.g., a first source), whether the detected IOCs received from the second customer are caused by receipt of a malicious electronic message that is proximate in time and/or similar in content to the particular malicious electronic message.

According to one embodiment of the disclosure, a management platform receives anomalous behaviors, namely IOCs, from multiple customers having different security deployments. Herein, a first customer deploys at least a message analytic appliance that is specifically designed to protect against attacks delivered via malicious electronic messages such as email messages that includes a malicious attachment, a malicious text message, or the like. One example of a message analytic appliance is an email analytic appliance is a FireEye® EX™ security platform manufactured by FireEye, Inc. of Milpitas, Calif. The email analytic appliance performs an analysis on email messages directed to the first customer in efforts to determine whether there is a high probability of the email messages being part of a malicious attack.

Thereafter, the management platform qualifies heuristics associated with the IOCs from the second customer. In qualifying these heuristics, the management platform determines whether or not a triggering event has occurred, which causes a predictive analysis to be conducted on the detected IOCs from the second customer. According to one embodiment of the disclosure, the triggering event may include a significant increase or shift in volume of a given type of IOC by a particular (second) customer, where the increase or shift exceeds a prescribed threshold (e.g., a prescribed total number, a selected increase or decrease in number or percentage, etc.). The triggering event signifies to the management platform that the particular customer has a prescribed likelihood (e.g., greater than 50%, greater than 70%, or greater than 90%) that it is experiencing a malicious attack.

After qualifying heuristics associated with the detected IOCs from the second customer, the management platform conducts a predictive analysis that evaluates whether these detected IOCs correspond to a set (e.g., a sequence, a particular group, etc.) of IOCs associated with known malware of a first message type that has been detected by another (first) customer. This first message type may include electronic mail (email) messaging having a format in accordance with RFC 5322 or another email format, text messaging having a format in accordance with Short Message Service (SMS), or any other recognized or proprietary communication format. For instance, the IOCs associated with known malware of a first electronic message type may include (1) a set of IOCs associated with an email message that has been previously detected at the first customer as being malicious, (2) a set of IOCs associated with a text message that has been previously detected at the first customer as being malicious, or another type of transmission. Whether the detected IOCs correspond to the set of IOCs is based on a selected degree of correlation needed between the detected IOCs and the set of IOCs associated with known malware of the first message type, where the level of correlation may be static in nature or may vary dynamically based on desired warning trigger levels, current work load of the management platform, or the like. This degree of correlation may also be referred to as "degree of correspondence".

Thereafter, once the detected IOCs are initially determined to be associated with malware of the first message type (e.g., a non-detected malicious electronic message such as a malicious email message, a malicious text message, a malicious global satellite positioning "GPS" message, website post message, etc.), the predictive analysis conducted by the management platform further determines a threat level, which signifies a level of confidence that the detected IOCs are caused by a malicious electronic message. The threat level may be based, at least in part, on the degree of correspondence determined by the management platform between the detected IOCs from the second customer and the set of IOCs associated with known malicious messages. Also, the threat level may be based on the manner in which the IOCs associated with the malicious electronic message(s) have been uncovered. As an example, the threat level may be based, at least in part, on the following: (1) similarity in type or order of the detected IOCs to the set of IOCs associated with the malicious electronic message; (2) whether the set IOCs associated with the malicious electronic message were detected or observed; (3) timing of the detected IOCs compared to the IOCs associated with the malicious electronic message; and/or (4) a sudden change in magnitude (e.g., number) of one or more of the detected IOCs compared to the level before the IOC(s) were detected in malicious electronic message at first customer.

For instance, as an illustrative embodiment, the predictive analysis is conducted to determine a threat level based on (i) a qualification of heuristics at the second customer, (ii) a determination of correspondence between detected IOCs from the second customer and IOCs associated with one or more known malicious electronic messages from the first customer, and/or (iii) a determination as to the manner in which the IOCs from the first customer (and perhaps other customers) were uncovered (e.g., detected and/or observed IOCs). Where the management platform determines that the IOC(s) provided by the second customer correspond to one or more IOCs detected by the first customer, a first threat level is assigned.

Similarly, upon determining that the IOC(s) provided by the second customer correspond to one or more IOCs observed by the first customer, the management platform assigns a second threat level. Given that the first customer is actually observing IOCs rather than detecting IOCs through virtual processing operations observed in a run-time environment such as may be established in a virtual machine running in a threat detection platform (and implemented in a host, endpoint, server, dedicated appliance or other electronic device), a greater threat level may be assigned.

Lastly, where the management platform determines that the IOC(s) provided by the second customer correspond to one or more IOCs observed by multiple customers, including the first customer, a third threat level is assigned. The third threat level may signify a malware campaign is being conducted.

In summary, an embodiment of the invention is directed to utilizing IOCs that are correlated with malware that has infected a first customer (e.g., first source) in efforts to determine, based on analysis of IOCs detected at second customer (e.g., a different source than the first source), a likelihood that identical malware or similar malware (e.g., of the same malware family or polymorphic malware) has also infected one or more network devices at the second customer. This likelihood may be classified according to a plurality of threat levels that may be the same as or differ from the measured likelihood by the first customer of the IOCs being associated with malware. These threat levels may be based on whether the IOCs were detected (e.g., through static analysis of an object under analysis or dynamic processing of the object in a run-time environment) or observed in network traffic in flight or content (e.g., files) at rest as monitored by the first customer. However, it is contemplated that the threat levels may be associated with any threshold of associated maliciousness risk or probability, which may be static (fixed) or dynamic (variable, e.g., based on prevailing conditions and/or user threat tolerance and user preference at a particular time), in order to provide the second customer with information as to the likelihood of one of more network devices being infected with a certain type of known malware.

I. Terminology

In the following description, certain terminology is used to describe aspects of the invention. For example, in certain situations, both terms "logic" and "engine" are representative of hardware, firmware and/or software that is configured to perform one or more functions. As hardware, logic (or engine) may include circuitry having data processing or storage functionality. Examples of such processing circuitry may include, but is not limited or restricted to one or more processors or processor cores; a programmable gate array; a microcontroller; an application specific integrated circuit; receiver, transmitter and/or transceiver circuitry; semiconductor memory; or combinatorial logic.

Logic (or engine) may be in the form of one or more software modules, such as executable code in the form of an executable application, an application programming interface (API), a subroutine, a function, a procedure, an applet, a servlet, a routine, source code, object code, a shared library/ dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device; and/or a semiconductor memory. As firmware, the executable code is stored in persistent storage.

The term "message" generally refers to information transmitted in a prescribed format, where each message may be in the form of one or more packets or frames, a Hypertext Transfer Protocol (HTTP) based transmission, or any other series of bits having the prescribed format. For instance, a message may include an electronic message such as an electronic mail (email) message; a text message in accordance with a SMS-based or non-SMS based format; an instant message in accordance with Session Initiation Protocol (SIP); or a series of bits in accordance with another messaging protocol. The message may be part of a "flow," namely a series of related packets that are communicated during a single communication session (e.g., Transport Control Protocol "TCP" session), between a source network device and a destination network device.

The term "malware" may be broadly construed as any information or action that is directed to adversely affect or disrupt operability of an electronic device, surreptitiously gather stored information and/or gain access to systems, or cause human interaction that results in unintended or unexpected outcomes. The malware may include an exploit that takes advantage of a software vulnerability, an advanced persistent threat (APT), or the like.

The term "transmission medium" is a physical or logical communication path within a network device such as an endpoint device, which is an electronic device with data processing and/or network connectivity such as, for example, a server; a stationary or portable computer including a desktop computer, laptop, electronic reader, netbook or tablet; a smart phone; a video-game console; wearable technology (e.g., watch phone, etc.). For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, a "set" of items generally relates a plurality of items although, in some case, a set may be broadly defined as including a single item. One type of "set" is a "sequence" of items that feature a particular order of occurrence.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary block diagram of a communication network 100 deploying an embodiment of the invention is shown. Herein, the communication network 100 comprises a management platform 110 communicatively coupled to a plurality of customers $120_1$-$120_M$ (M≥2, M=2 for this embodiment) via a network 130. The network 130 may include a public network such as the Internet, a private network (e.g., a local area network "LAN", wireless LAN, etc.), or a combination thereof. It is contemplated that the number and type of customers $120_1$-$120_M$, which are communicatively coupled to the same management platform 110, may be selected based on a variety of parameters, including industry or agency type (e.g., technology, manufacturing, energy, health care, entertainment, financial services, banking, governmental, etc.); field type (e.g., electronic component manufacturing, Internet services, etc.); geographical location of the customer; and/or requested level of service. It is contemplated that the grouping of customers $120_1$-$120_M$ based on certain parameters may improve detection as some malicious attacks may be industry, field and/or geographic specific.

Herein, each customer $120_1, \ldots,$ or $120_M$ may be broadly construed as a network-based entity, which includes one or more threat detection platforms (TDPs) where each TDP is configured to analyze information propagating into and/or from the network-based entity and upload one or more detected indicators of compromise (IOCs) destined for the management platform 110. The network-based entity may represent an organization, a subset of the organization (e.g. a subsidiary where different customers may be different subsidiaries that are part of the same parent organization, a division, group, etc.), a particular enterprise network, or the like.

According to one embodiment of the disclosure, as shown in FIG. 1, the first customer $120_1$ may include, at least in part, one or more threat detection platforms (TDPs), such as a first TDP $140_1$ and a second TDP $140_2$ for this embodiment. As shown, the first TDP $140_1$ is a network device that includes message analysis logic 150 and a second TDP $140_2$ is a network device operating as a web-based security appliance that includes network traffic analysis logic 160. Similarly, a second customer $120_2$ may include, at least in part, one or more threat detection platforms (TDPs), such as a third TDP $140_3$ in this embodiment.

As described below in detail, the message analysis logic 150 of the first TDP $140_1$ is configured to conduct a specific analysis of the content of a message of a first format type (e.g., email messages, text messages, etc.) transmitted and/or received over the network 130. Based on this analysis, the first TDP $140_1$ is capable of determining whether a malicious attack originated from a malicious electronic message and the particular malicious electronic message. The second network traffic analysis logic 160 of the second TDP $140_2$ is configured to conduct an analysis of information associated with network traffic over the network 130 in efforts to determine if this information suggests the presence of a malicious attack. But, without the first TDP $140_1$, the second TDP $140_2$ is unable to determine whether the origin of the malicious attack is from a malicious electronic message.

More specifically, according to one embodiment of the disclosure, the first TDP $140_1$ is deployed in a customer's public network (sometimes referred to as the "Demilitarized Zone" or "DMZ"), where email servers most often reside. Of course, the location of the TDP $140_1$ may vary, provided that the TDP $140_1$ has access to the communication path of the transmitted messages and is communicatively coupled to the management platform 110. For instance, the TDP $140_1$ could be deployed outside of customer's premises. For instance, where the message is a SMS message, the TDP $140_1$ could be deployed in a cell carrier network. Furthermore, the TDP $140_1$ may be part of cloud services, or even deployed within an endpoint device (e.g., smartphone, computer, etc.).

Herein, the message analysis logic 150 enables the first TDP $140_1$ to operate, at least in part, as an email analytic appliance by performing an analysis of one or more portions of an incoming email message, namely its header, content, links and/or attachments. This analysis may be performed by one or more virtual machines (hereinafter "virtual machine (s)" or "VM(s)" 170) deployed within the first TDP $140_1$. Each of the virtual machine(s) may be configured with a software profile, which corresponds to a particular message management application (e.g., Microsoft® Outlook, iPad™ native email application, native email application on Windows® Phone 8, etc.) that is being used by a network device deployed within the same enterprise network as the first TDP $140_1$. The virtual machine(s) may be configured to support concurrent virtual execution of a variety of different software configurations in efforts to verify that a malicious email message is part of a malicious attack.

The virtual machine(s), in combination with other logic (e.g., processing logic 175) within the first TDP $140_1$, are adapted to simulate the receipt and execution of content associated with the malicious email message within a run-time environment as expected by the email message. For instance, the processing logic 175 is configured to emulate and provide anticipated signaling to the virtual machine(s) during virtual processing.

As an example, the processing logic 175 may be adapted to provide, and sometimes modify, information (e.g., an Internet Protocol "IP" address, etc.) associated with an email message under analysis in order to control return signaling back to a virtual execution environment that includes the virtual machines. Hence, the processing logic 175 may suppress (e.g., discard) the return network traffic so that the return network traffic is not transmitted to the network 130.

Unlike the first TDP $140_1$, both the second TDP $140_2$ and the third TDP $140_3$ include network traffic analysis logic 160, which operates as a web-based security appliance by analyzing information associated with network traffic over the network 130 to determine if the information suggests the occurrence of a malicious attack. By itself without operability of the first TDP $140_1$, neither the second TDP $140_2$ nor the third TDP $140_3$ is able to determine the origin of the malicious attack. An illustrative example of the network traffic analysis logic 160 is illustrated as the MCD System in a prior U.S. Patent Application entitled "Dynamically Remote Tuning of Malware Content Detection System," U.S. patent application Ser. No. 14/231,216 filed Mar. 31, 2014, the contents of which are incorporated by reference.

Referring still to FIG. 1, the management platform 110 is adapted to receive information from the plurality of customers $120_1$-$120_M$, notably TDPs $140_1$-$140_3$. As shown, the first TDP $140_1$ and the second TDP $140_2$ are associated with the first customer $120_1$ and the third TDP $140_3$ is associated with a second customer $120_2$. Upon receipt of information from the TDPs $140_1$-$140_3$, the management platform 110 qualifies heuristics associated with the received information in order to determine if the received information indicates that a malicious attack is occurring. Of course, certain heuristics may be specifically selected for analysis during the qualification operations, as these specific heuristics may be directed to functionality normally targeted by a malware attack via a malicious email message. The "heuristics" may encompass rules, policies, statistics, signatures, hash values, or other determinative attributes or characteristics of received information under analysis, and thus, qualification of the heuristics involves analysis of the received information based on the heuristics.

As an illustrative example, after receipt of received information including indicators of compromise (IOCs), namely information associated with anomalous behaviors detected by network traffic analysis logic 160 within the TDP $140_3$, the management platform 110 qualifies the heuristics associated with the IOCs in order to determine whether a triggering event has occurred, which identifies that a malicious (email-based) attack may be occurring at the second customer $120_2$. For instance, the management platform 110 may determine whether a particular IOC-based threshold has been met (e.g., exceeds or falls below the threshold). As an example, the particular IOC-based threshold may be associated with an average number of a certain type of IOC detected by multiple TDPs with network traffic analysis logic (or perhaps TDP $140_3$ by itself) over a prescribed amount of time. This threshold is met if the detected IOCs are equal to or greater in number that the IOC average. Of course, other types of thresholds may be used, including a preselected number of total IOCs that may be dependent or independent of type, mere presence of a particular type of IOC, or the like.

If the IOC heuristics have been qualified, the management platform 110 conducts a predictive analysis associated with the detected IOCs received from the TDP $140_3$ to determine if these IOCs correspond to a set of IOCs associated with known malware of a first message type that are provided from the TDP $140_1$. For instance, the amount of similarity between the detected IOCs and the set of IOCs associated with the known malware of the first message type in order to determine whether the detected IOCs correspond to the set of IOCs may be static or dynamic in nature (e.g., the degree of correspondence between detected IOCs and the IOCs associated with the known malware may vary based on the operating state of the management platform 110). For instance, when the management platform 110 is operating in a first operating state, the degree of correspondence may be set at a high level where the detected IOCs need to be present and in the same chronological order as the set of IOCs associated with the known malware. Alternatively, when the management platform 110 is operating in a second operating state, the degree of correspondence may be set at a lower level where the detected IOCs correspond to the known malware IOCs if multiple (but not all) IOCs of the detected IOCs are present in the set of IOCs.

When the IOC heuristics have been qualified and the predictive analysis concludes, with a certain degree of confidence that the detected IOCs are associated with a malicious attack originating from a malicious email message, the management platform 110 determines a type of response. As an illustrative example, the management platform 110 may adjust the threat level, which is associated with the degree of confidence that the detected IOCs are caused by a malicious electronic message, based on whether the set of IOCs associated with the known malware of the first message type are detected by the TDP $120_1$ during static and/or virtual processing of the malicious electronic message or are actual observed behavior(s) by a network device communicatively coupled to the TDP $140_3$. Herein, actual observed behavior(s) are assigned a higher threat level than detected behavior(s). More details of the assignment of threat level are described in FIG. 6.

Figure 2A:
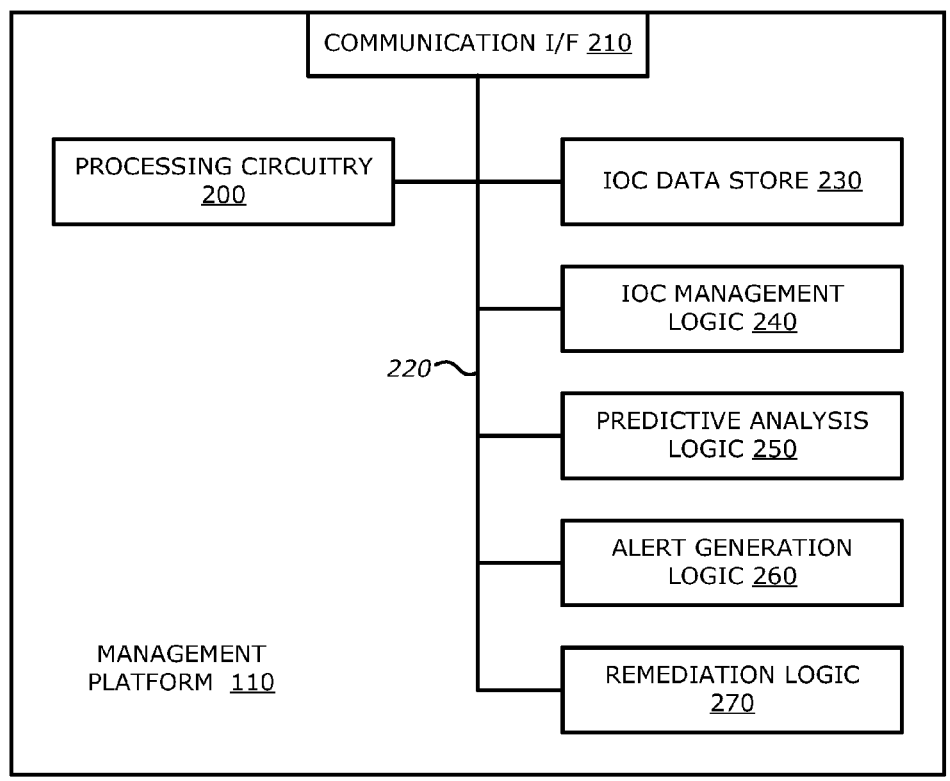
FIG. 2A is a block diagram of an exemplary embodiment of the management platform 110 of FIG. 1.

Referring now to FIG. 2A, a block diagram of an exemplary embodiment of the management platform 110 is shown. Herein, the management platform 110 includes processing circuitry 200 that are coupled to communication interface logic 210 via a first transmission medium 220. Communication interface logic 210 enables communications with customers $120_1$-$120_M$, notably one or more TDP $140_1$-$140_3$ deployed by the customers as shown in FIG. 1. According to one embodiment of the disclosure, communication interface logic 210 may be implemented as a physical interface including one or more ports for wired connectors. Additionally, or in the alternative, communication interface logic 210 may be implemented with one or more radio units for supporting wireless communications with other electronic devices.

As shown, processing circuitry 200 is further coupled to a data storage 230, IOC management logic 240, predictive analysis logic 250, alert generation logic 260 and remediation logic 270. According to one embodiment of the disclosure, the IOC management logic 240 is configured to acquire information associated with detected and/or observed anomalous behaviors (IOCs) from the customers $120_1$-$120_M$, where the IOCs may be acquired based upon actions by security personnel manually controlling the maintenance platform 110 to obtain the IOCs in response to an event or an elapsed period of time. Alternatively, the IOCs from the customers $120_1$-$120_M$ may be received automatically in accordance with a periodic or aperiodic uploading of the IOCs. The uploading may be accomplished by a push, pull or polling technique in which the TDPs $140_1$-$140_3$ are configured to automatically transmit the IOCs in response to an activity (e.g., detection of the triggering event that identifies that a malicious, email-based attack may be occurring) and/or expiration of an elapsed period of time.

Upon receiving IOCs from TDPs $140_1$-$140_3$ shown in FIG. 1, the IOC management logic 240 stores the received IOCs within the data store 230, which may be organized to identify which IOCs are received from which customers and which IOCs are associated with known malware associated with a particular message type. For instance, the IOCs may be organized to identify which IOCs are associated with known malicious electronic messages, where these IOCs include the anomalous behaviors and/or metadata associated with the malicious electronic messages. Examples of the metadata may include the arrival time of the message and/or profile information associated with the recipient, which may include one or more of the following: geographical origin of the recipient, group membership, company type, industry type, or the like.

Thereafter, the IOC management logic 240 qualifies heuristics associated with the detected IOCs from the third TDP $140_3$ of FIG. 1 by determining whether a triggering event has occurred to denote that a malicious attack due to a non-detected malicious electronic message may be occurring at the second customer $120_2$. The triggering event activates predictive analysis logic 250, which causes a predictive analysis to be conducted on the detected IOCs from the second customer $120_2$ of FIG. 1. As described above, the triggering event may include an increase or shift in volume of a given type of IOC by a particular (second) customer that exceeds a prescribed threshold.

More specifically, the predictive analysis logic 250 conducts a predictive analysis that evaluates whether the detected IOCs from the second customer $120_2$ of FIG. 1 correspond to a set of IOCs associated with known malware of a first message type that has been detected by another customer (e.g., first customer $120_1$). For instance, the set of IOCs may be associated with a known type of malicious email message or a known type of malicious text message.

Thereafter, once the detected IOCs are initially determined to be associated with a non-detected malicious (email or text) message, the predictive analysis logic 250 further determines a threat level, which signifies a degree of confidence that the detected IOCs are caused by a malicious email message or a malicious text message. The threat level may be based, at least in part, on the degree of correspondence determined by the predictive analysis logic 250 between the detected IOCs from the second customer $120_2$ of FIG. 1 and the set of IOCs associated with known malicious electronic messages. Additionally, the threat level may be based on the manner in which the set of IOCs associated with the malicious electronic message(s) was uncovered, where observed IOCs provide a greater weighting and a higher threat level than detected IOCs and observations by multiple customers increase the threat level.

The alert generation logic 260 and the remediation logic 270 perform operations based, at least in part, on the determined threat level. For instance, in response to computation of a first threat level, the alert generation logic 260 may merely issue an alert to security personnel of the second customer. However, in response to computation of a first threat level, the alert generation logic 260 may generate multiple alerts, in which the alerts may be sent through different mediums (e.g., network email, text message, automated cellular telephone call, etc.). Also, the remediation logic 270 may operate to provide suggested actions to remediate the potential malicious email message (e.g., search email servers for email messages associated with a particular phrase in the subject line or originating from a particular domain, specific attachment, specific size, originated from a specific source IP or MAC address, arrival time within a particular time period (e.g., range in minutes, hours or days), block the potential malicious email message from being opened or processed, and/or automatically delete the potential malicious email message with or without user notification).

Figure 2B:
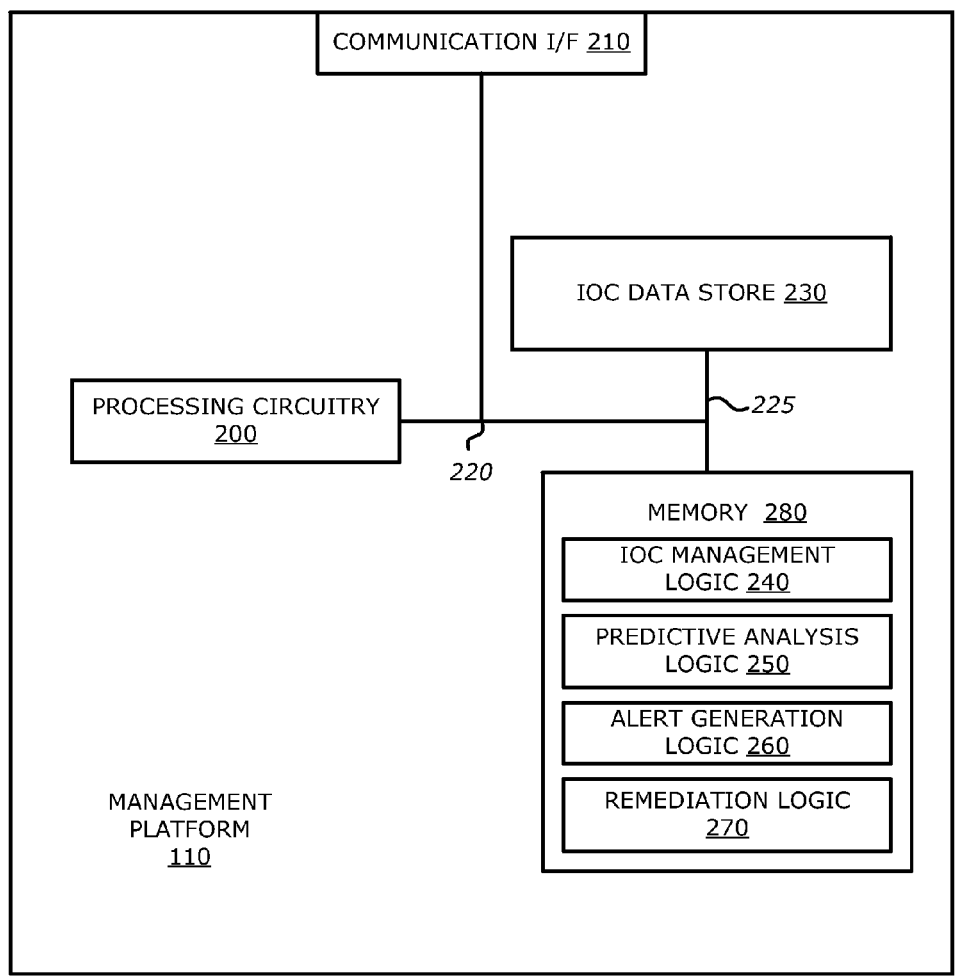
FIG. 2B is a block diagram of an exemplary embodiment of a logical representation of the management platform 110 of FIG. 1.

Referring now to FIG. 2B, a block diagram of an exemplary embodiment of a logical representation of the management platform 110 is shown. Herein, the management platform 110 includes processing circuitry 200 that are coupled to the communication interface logic 210 via the first transmission medium 220 as well as the data store 230 and persistent storage 280 via a second transmission medium 225.

According to one embodiment of the disclosure, persistent storage 280 may include (a) the IOC management logic 240; (b) the predictive analysis logic 250; (c) the alert generation logic 260; and (d) the remediation logic 270. Of course, when implemented partially or fully in hardware, one or more of these logic units could be implemented separately from each other.

Figure 3:
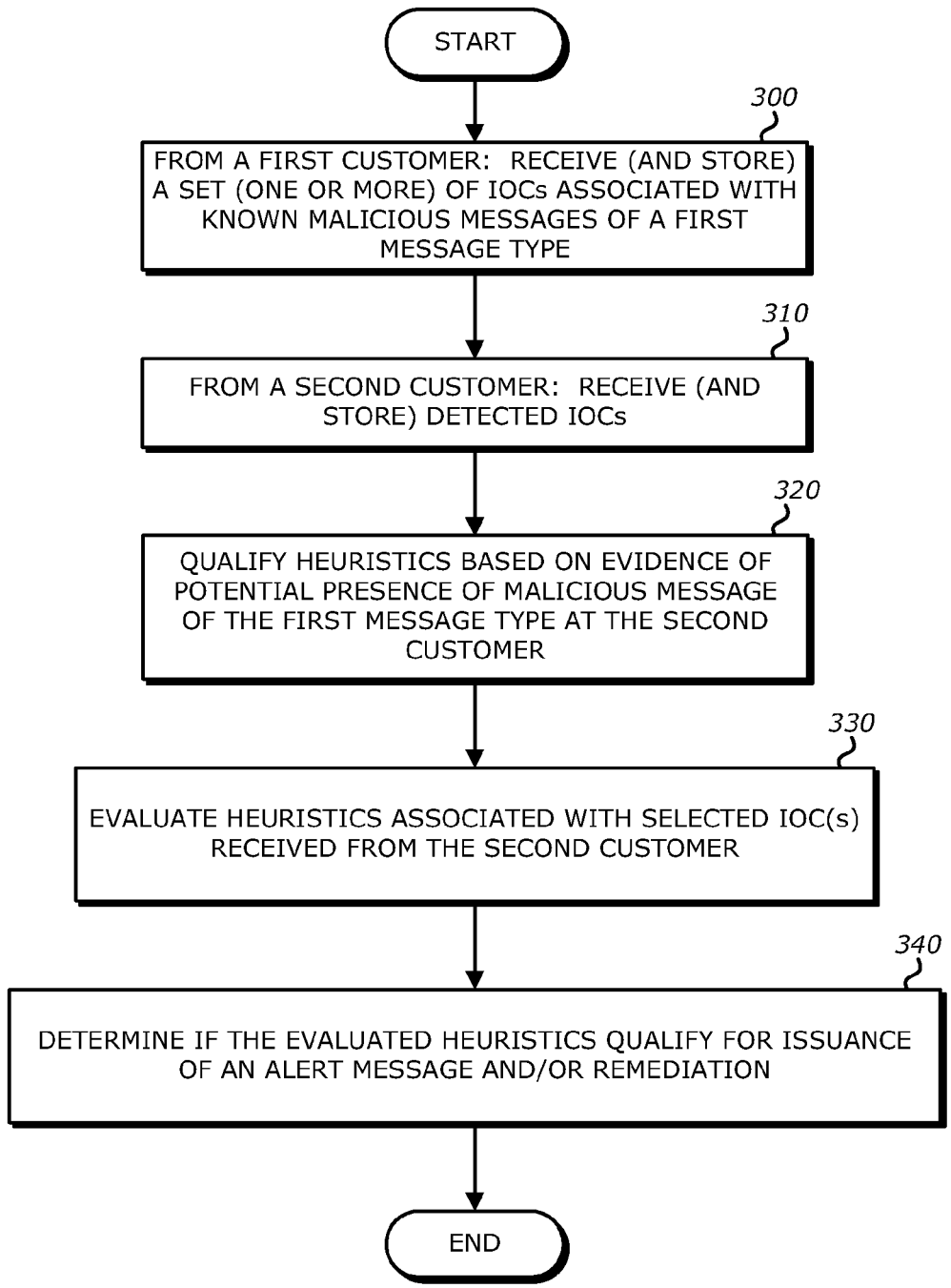
FIG. 3 is an illustrative embodiment of the operations conducted by the management platform 110 of FIG. 1 for conducting a predictive analysis.

Referring now to FIG. 3, an illustrative embodiment of the operations conducted by the management platform 110 of FIG. 1 for conducting a predictive analysis, based on IOCs provided from a first customer, to determine that a malicious attack is being conducted by a malicious electronic message on a second customer is shown. The management platform 110 receives and stores IOC information from a plurality of customers, including at least one set of IOCs associated with known malicious electronic message from the first customer and detected IOCs from the second customer (blocks 300 and 310).

Thereafter, the management platform qualifies heuristics associated with the detected IOCs from the second customer in order to establish evidence of a potential presence of a malicious electronic message of a first message type at the second customer (block 320). Thereafter, the management platform evaluates heuristics associated with selected IOCs, which may be part or all of the detected IOCs, and determines if the evaluated heuristics qualify for issuance of an alert message and/or remediation (blocks 330 and 340).

Figure 4:
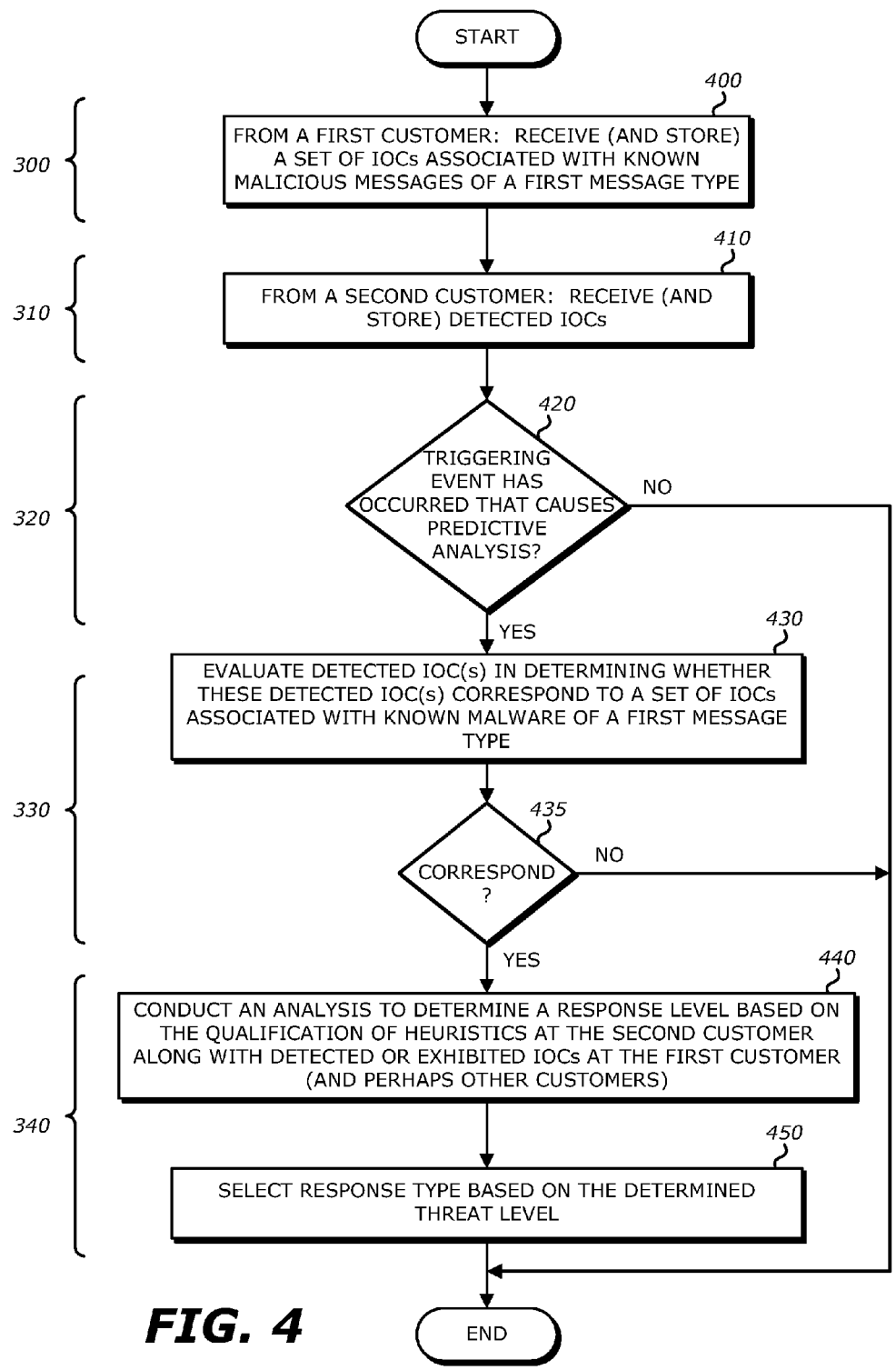
FIG. 4 is a detailed embodiment of the operations in conducting predictive analysis by the management platform.

Referring to FIG. 4, a detailed embodiment of the operations conducted by the management platform as set forth in FIG. 3 for conducting predictive analysis is shown. The management platform 110 receives and stores IOC information from a plurality of customers, including at least one set of IOCs associated with known malicious electronic message from the first customer and detected IOCs from the second customer (blocks 400 and 410).

Thereafter, the management platform qualifies heuristics associated with the IOCs from the second customer by determining whether a triggering event has occurred that causes a predictive analysis to be conducted on the detected IOCs from the second customer (block 420). For instance, as an illustrative example, the triggering event may include a condition where the detected IOCs from the second customer indicate that a selected threshold has been met (e.g., a particular increase or decrease in volume of a given type or types of IOCs has occurred, etc.).

After determining that a triggering event has occurred, the management platform conducts a predictive analysis that evaluates whether these detected IOCs correspond to a set of IOCs associated with known malware of a first message type that has been detected by first customer (blocks 430 and 435). For instance, as an illustrative example, the ordering and content of the IOCs are compared with the set of IOCs.

Thereafter, once the detected IOCs are determined to correspond to the set of IOCs, a predictive analysis is conducted by the management platform to determine a threat level that signifies a degree of confidence that the detected IOCs are caused by a malicious electronic message (block 440). The threat level may be based, at least in part, on a qualification of heuristics at the second customer, such as the degree of correspondence determined by the management platform between the detected IOCs from the second customer and the set of IOCs associated with known malicious electronic messages. Also, the threat level may be based on the manner in which the IOCs associated with the malicious electronic message(s) were uncovered. As an example, the threat level may be based, at least in part, on the following: (1) similarity of the detected IOCs to the set of IOCs associated with the malicious electronic message; (2) whether the set IOCs associated with the malicious electronic message were detected or observed; and/or (3) timing of the detected IOCs compared to the IOCs associated with the malicious electronic message.

Figure 5:
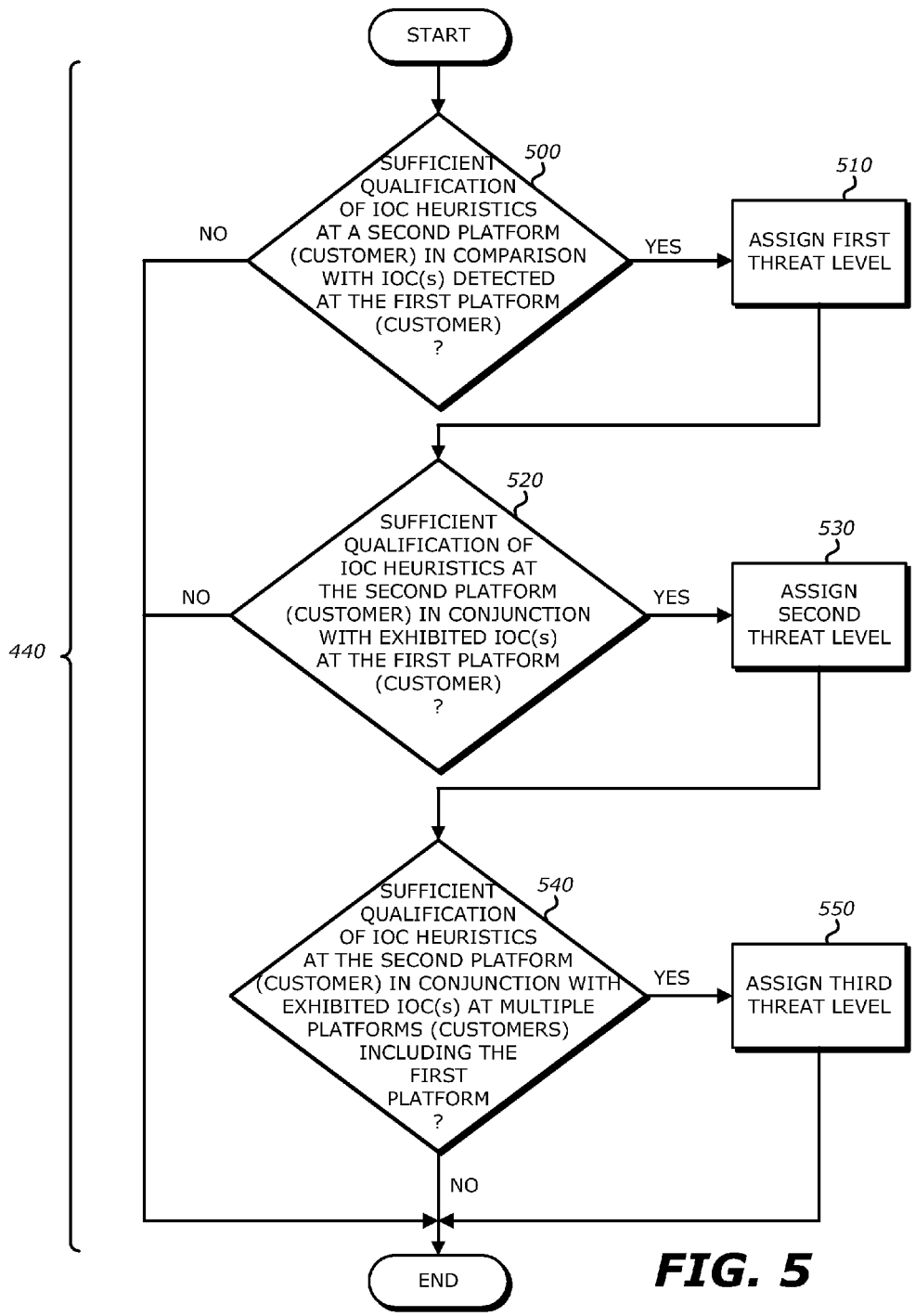
FIG. 5 is an exemplary embodiment of the predictive analysis conducted by the management platform in determining a threat level that signifies a degree of confidence that the detected IOCs are caused by a malicious electronic message.

As an illustrative embodiment, as shown in FIG. 5, a first determination is made as to whether there is sufficient qualification of IOC heuristics at the second customer compared to IOCs detected at the first customer and associated with a malicious electronic message (block 500). If there are sufficient qualifications in that the detected IOCs of the second customer correspond to IOCs detected by the first customer, a first threat level is assigned (block 510). Otherwise, no threat level is assigned to signify that there is no apparent correspondence between the detected IOCs at the second customer and IOCs associated with a malicious electronic message.

Thereafter, a second determination is made as to whether there is sufficient qualification of IOC heuristics at the second customer compared to IOCs observed at the first customer and associated with a malicious electronic message (block 520). If there are sufficient qualifications in that the detected IOCs of the second customer correspond to IOCs observed by the first customer, a second threat level is assigned (block 530). Otherwise, the predictive analysis maintains that the detected IOCs from the second customer to the assigned first threat level.

Lastly, a third determination is made as to whether there is sufficient qualification of IOC heuristics at the second customer compared to IOCs observed at multiple customers, inclusive of the first customer (block 540). If there are sufficient qualifications in that the detected IOCs of the second customer correspond to IOCs observed by multiple customers including the first customer, a third threat level is assigned (block 550). Otherwise, the predictive analysis maintains that the detected IOCs from the second customer to the assigned second threat level.

Referring back to FIG. 4, a particular type of response is selected based on the determined threat level (block 450). For instance, in accordance with an illustrative embodiment shown in FIG. 6, after the management platform has determined the threat level associated with detected IOCs under analysis from the second customer (block 600), the threat level is used to determine the response type (blocks 610-650). More specifically, if the qualification results in a first threat level, a first level response is conducted (blocks 610 and 620). As an illustrative example, an alert message may be sent to security personnel associated with the second customer with information pertaining to a potential malicious email message that may be stored within one of its email servers.

Similarly, if the qualification results in a second threat level, a second level response is conducted (blocks 630 and 640). The second level response may be assigned higher urgency than the first level response. For example, an alert message may be sent to security personnel associated with the second customer with information pertaining to a potential malicious email message that may be stored within one of its email servers along with additional information including contact information for security personnel and/or marketing representatives associated with the management platform.

Otherwise, the qualification resulted in a third threat level, and thus, warrants that a third level response is conducted (block 650). The third level response may be assigned the highest urgency. For example, multiple alert messages may be sent to security personnel associated with the second customer with information pertaining to a potential malicious email message that may be stored within one of its email servers. These alert messages may be successive or through different mediums (e.g., email message, text message over a cellular network, etc.). Additionally, additional information including contact information for security personnel and/or marketing representatives associated with the management platform may be provided.

Figure 6:
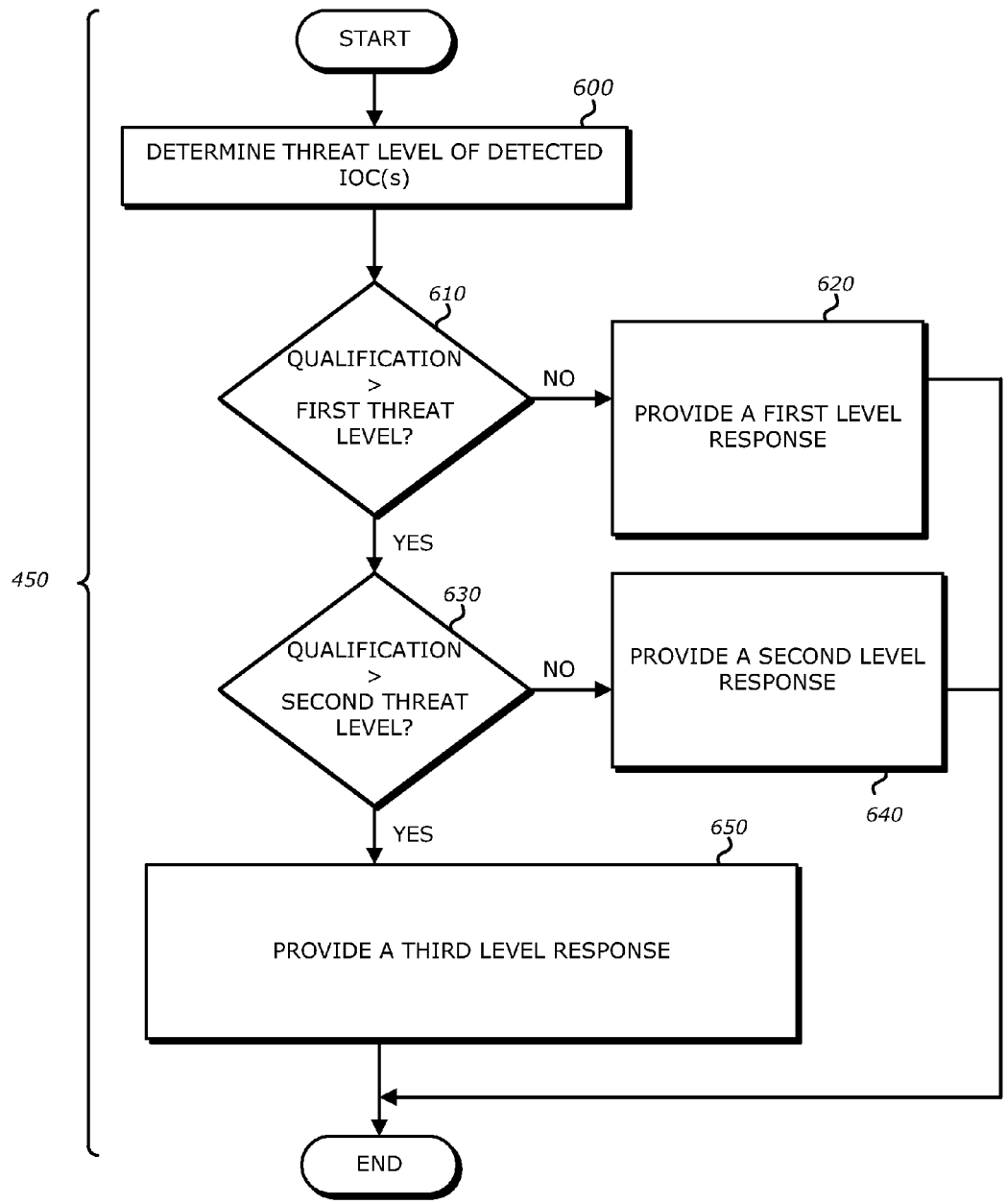
FIG. 6 is an exemplary embodiment of a first response scheme that includes selection of different response levels by the management platform based on the determined threat level.
Figure 7:
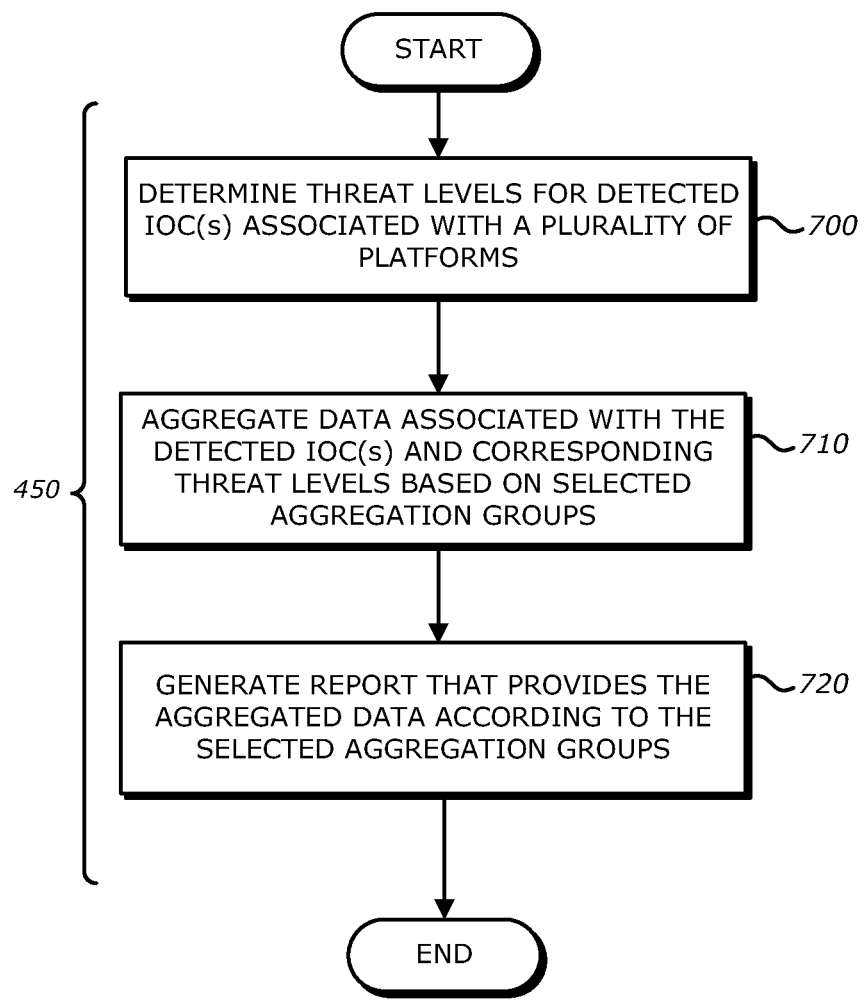
FIG. 7 is an exemplary embodiment of a second response scheme by the management platform upon determining specific threat levels for the detected IOCs.

In lieu of transmitting messages to the customers as shown in FIG. 6, as an alternative embodiment, the particular type of response selected may be directed as to whether a report should be generated that provides aggregated data of potential malicious electronic messages that have not been detected by customers without an email analytic appliance. Herein, as shown in FIG. 7, the management platform determines threat levels for the detected IOCs associated with a plurality of customers without message analytic appliances (block 700). The data associated with the detected IOCs and corresponding threat levels are aggregated based on selected aggregation groups (block 710). These aggregation groups may be subsets or supersets of the grouping supported by the management platform. After aggregating the data associated with the detected IOC(s) and the corresponding threat level information, the management platform generates reports that provide such information according to the selected aggregation groups (block 720).

In the foregoing description, the invention is described with reference to specific exemplary embodiments thereof. It will, however, be evident that various modifications and changes may be made thereto without departing from the broader spirit and scope of the invention as set forth in the appended claims. For instance, the above-described analysis is applicable to electronic messages as well as other types of objects under analysis (e.g. Portable Document Format "PDF" documents, executables, web downloads, etc.).

What is claimed is:

1. A computerized method for malware detection conducted by a management platform including processing circuitry and a data store, comprising:
    receiving a set of indicators of compromise (IOCs) from a first source for storage in the data store, the set of IOCs identified as being caused by a known malware associated with a first message type;
    receiving, for storage in the data store, one or more IOCs from a second source that is different from the first source where a cause of the one or more IOCs is unknown; and
    responsive to a triggering event that includes a shift in volume of a given type of IOC at the second source that exceeds a prescribed threshold, conducting a predictive analysis by the processing circuitry of the one or more IOCs received from the second source to determine whether the received IOCs from the second source correspond to the set of IOCs received from the first source,
    wherein information associated with at least the set of IOCs is used to locate a malware associated with the first message type that is undetected at the second source and is the cause of the one or more IOCs at the second source.

2. The computerized method of claim 1, wherein the set of IOCs caused by the known malware associated with the first message type includes a set of IOCs associated with an email message that has been previously detected at the first source as being malicious.

3. The computerized method of claim 1, wherein the set of IOCs caused by the known malware associated with the first message type includes a set of IOCs associated with a text message that has been previously detected at the first source as being malicious.

4. The computerized method of claim 1, wherein the triggering event associated with the shift in volume of a given type of IOC at the second source includes an increase in volume of the given type of IOC at the second source that exceeds the prescribed threshold.

5. The computerized method of claim 1, wherein the conducting the predictive analysis of the one or more IOCs received from the second source to determine whether the one or more IOCs received from the second source correspond to the set of IOCs received from the first source comprises determining whether a prescribed number of the received IOCs are present in the set of IOCs associated with the known malware.

6. The computerized method of claim 1, wherein the conducting the predictive analysis of the one or more IOCs received from the second source to determine whether the one or more IOCs received from the second source correspond to the set of IOCs received from the first source comprises determining whether the one or more IOCs received from the second source are present and in the same chronological order as the set of IOCs associated with the known malware.

7. The computerized method of claim 1, wherein a degree of correspondence for determining whether the one or more IOCs received from the second source correspond to the set of IOCs received from the first source is dynamic.

8. The computerized method of claim 1, wherein the determining whether the IOCs received from the second source correspond to the set of IOCs received from the first source further comprises
    determining a threat level associated with the one or more IOCs, the threat level signifies a degree of confidence that the one or more IOCs are caused by a malicious electronic message;
    selecting a particular type of response based on the determined threat level.

9. The computerized method of claim 8, the threat level is determined based, at least in part, on whether the set of IOCs from the first source are detected or observed, where a determined correspondence between the one or more IOCs received from the second source and the set of IOCs that have been observed by the first source is assigned a higher threat level than a determined correspondence between the one or more IOCs received from the second source and the set of IOCs detected by the first source.

10. The computerized method of claim 8, wherein the threat level is determined based, at least in part, on a timing of the one or more IOCs compared to a timing of the set of IOCs associated with the known malware that includes an identified malicious electronic message.

11. The computerized method of claim 1, wherein the malware associated with the first message type that is undetected at the second source comprises a first malicious electronic message.

12. The computerized method of claim 11, the information associated with at least the set of IOCs that is used to locate the first malicious electronic message comprises an arrival time of a second malicious electronic message detected at the first source.

13. The computerized method of claim 11, the information associated with at least the set of IOCs that is used to locate the first malicious electronic message further comprises information associated with the one or more IOCs received from the second source that include one or more of (i) a geographical origin of the second source, (ii) a group membership of the second source, (iii) a company type of the second source, or (iv) a type of industry to which the second source belongs.

14. The computerized method of claim 1, wherein the receiving of the set of IOCs from the first source and the receiving of the one or more IOCs from the second source comprises receiving the set of IOCs and the receiving of the one or more IOCs in transit over a network.

15. The computerized method of claim 14, wherein the receiving of one or more IOCs is conducted automatically over a network.

16. A system comprising:
    processing circuitry;
    a first logic in communication with the processing circuitry, the first logic is configured to (i) receive a set of indicators of compromise (IOCs) that are detected to have been caused by a known malware associated with a first message type from a first source, (ii) receive one or more IOCs from a second source that is different from the first source where a cause of the one or more IOCs is unknown, and (iii) determine whether a triggering event has occurred that signifies at least a prescribed likelihood that the one or more IOCs from the second source are caused by a undetected malicious electronic message present at the second source; and a second logic in communication with the processing circuitry, the second logic is configured to (i) conduct a predictive analysis that evaluates whether the received IOCs from the second source correspond to the set of IOCs caused by the known malware associated with the first message type, and (ii) determine a threat level, which signifies a level of confidence that the received IOCs from the second source are caused by the undetected malicious electronic message.

17. The system of claim 16, wherein the set of IOCs associated with the known malware includes a set of IOCs associated with an electronic mail message that has been previously detected at the first source as being malicious.

18. The system of claim 16, wherein the set of IOCs associated with the known malware includes a set of IOCs associated with a text message that has been previously detected at the first source as being malicious.

19. The system of claim 16, wherein the second logic determines whether the received IOCs from the second source correspond to the set of IOCs received from the first source occurs in response to the triggering event.

20. The system of claim 19, wherein the triggering event includes an increase in volume of a given type of IOC within the received IOCs from the second source event that exceeds a prescribed threshold.

21. The system of claim 16, wherein the second logic evaluates whether the received IOCs from the second source correspond to the set of IOCs received from the first source by determining whether a particular number of the received IOCs from the second source are present and in the same chronological order as in the set of IOCs associated with the known malware.

22. The system of claim 21, wherein a degree of correspondence for evaluating whether the received IOCs from the second source correspond to the set of IOCs received from the first source is dynamic.

23. The system of claim 21, wherein the second logic, after determining the threat level, selects a particular type of response based on the determined threat level.

24. The system of claim 23, wherein the second logic determines the threat level based, at least in part, on whether the set of IOCs from the first source is detected or observed, where a determined correspondence between the received IOCs and the set of IOCs that have been observed by the first source is assigned a higher threat level than the determined correspondence between the received IOCs and the set of IOCs detected by the first source.

25. The system of claim 16, wherein the second logic determines the threat level based, at least in part, on a timing of the received IOCs compared to a timing of the set of IOCs, the first message type includes an electronic message.

26. A system comprising:
processing circuitry; and
a memory coupled to the processing circuitry, the memory includes
(1) logic that controls receipt of (a) a set of indicators of compromise (IOCs) from a first source and the set of IOCs are identified as being caused by a malicious electronic message of a first message type and (b) one or more IOCs from a second source that is different from the first source where a cause of the one or more IOCs is unknown,
(2) logic that conducts a predictive analysis to determine whether the one or more IOCs from the second source are caused by an undetected malicious electronic message, the predictive analysis includes evaluating whether the one or more IOCs from the second source correspond to the set of IOCs associated with the malicious electronic message and determining a threat level, which signifies a level of confidence that the one or more IOCs from the second source are caused by the undetected malicious electronic message, and
(3) logic that selects a particular type of response based on the determined threat level.

27. The system of claim 26, wherein the set of IOCs associated with the known malware includes a set of IOCs associated with an electronic mail message that has been previously detected at the first source as being associated with the malicious electronic message.

28. The computerized method of claim 27, wherein the first source is a network device that includes message analysis logic and the second source is a network device operating as a web-based security appliance.

29. The system of claim 26, wherein the logic that conducts the predictive analysis to determine whether the received one or more IOCs from the second source correspond to the set of IOCs associated with the malicious electronic message performs the predictive analysis in response to a triggering event.

30. The system of claim 29, wherein the triggering event includes an increase in volume of a given type of IOC within the received IOCs from the second source event that exceeds a prescribed threshold.

31. The system of claim 26, wherein the logic that conducts the predictive analysis evaluating whether the one or more IOCs from the second source correspond to the set of IOCs associated with the malicious electronic message by determining whether a particular number of the one or more IOCs from the second source are present and in the same chronological order as in the set of IOCs associated with the malicious electronic message.

32. The system of claim 31, wherein the particular number for evaluating whether the one or more IOCs from the second source correspond to the set of IOCs received from the first source is dynamic.

33. The system of claim 26, wherein the logic that conducts the predictive analysis evaluating whether the one or more IOCs from the second source correspond to the set of IOCs associated with the malicious electronic message by determining the threat level based, at least in part, on a timing of the one or more IOCs compared to a timing of the set of IOCs, the first message type includes an electronic message.

34. A computerized method for malware detection conducted by a network device including processing circuitry and a data store, comprising:
receiving a set of indicators of compromise (IOCs) from a first source, the set of IOCs identified as being caused by a known malware associated with a first message type;
receiving one or more IOCs from a second source that is different from the first source where a cause of the one or more IOCs is unknown; and
conducting a predictive analysis of the one or more IOCs received from the second source to determine whether the received IOCs from the second source correspond to the set of IOCs received from the first source by (i) determining a threat level associated with the one or more IOCs, the threat level signifies a degree of confidence that the one or more IOCs are caused by a malicious electronic message, and (ii) selecting a particular type of response based on the determined threat level,
wherein information associated with at least the set of IOCs is used to locate a malware associated with the first message type that is undetected at the second source and is the cause of the one or more IOCs at the second source.

35. The computerized method of claim 34, wherein the set of IOCs includes a set of IOCs associated with an email message that has been previously detected at the first source as being malicious.

36. The computerized method of claim 34, wherein the set of IOCs includes a set of IOCs associated with a text message that has been previously detected at the first source as being malicious.

37. The computerized method of claim 34, wherein the conducting the predictive analysis of the one or more IOCs received from the second source to determine whether the received IOCs from the second source correspond to the set of IOCs received from the first source occurs in response to a triggering event.

38. The computerized method of claim 37, wherein the triggering event includes an increase in volume of a given type of IOC at the second source that exceeds a prescribed threshold.

39. The computerized method of claim 34, wherein the conducting the predictive analysis of the one or more IOCs received from the second source to determine whether the one or more IOCs received from the second source correspond to the set of IOCs received from the first source comprises determining whether a prescribed number of the received IOCs are present in the set of IOCs associated with the known malware.

40. The computerized method of claim 34, wherein the conducting the predictive analysis of the one or more IOCs received from the second source to determine whether the one or more IOCs received from the second source correspond to the set of IOCs received from the first source comprises determining whether the one or more IOCs received from the second source are present and in the same chronological order as the set of IOCs associated with the known malware.

41. The computerized method of claim 34, wherein a degree of correspondence for determining whether the one or more IOCs received from the second source correspond to the set of IOCs received from the first source is dynamic.

42. The computerized method of claim 34, the threat level is determined based, at least in part, on whether the set of IOCs from the first source are detected or observed, where a determined correspondence between the one or more IOCs received from the second source and the set of IOCs that have been observed by the first source is assigned a higher threat level than a determined correspondence between the one or more IOCs received from the second source and the set of IOCs detected by the first source.

43. The computerized method of claim 34, wherein the threat level is determined based, at least in part, on a timing of the one or more IOCs compared to a timing of the set of IOCs associated with the known malware that includes an identified malicious electronic message.

44. The computerized method of claim 34, wherein the malware associated with the first message type that is undetected at the second source comprises a first malicious electronic message.

45. The computerized method of claim 44, the information associated with at least the set of IOCs that is used to locate the first malicious electronic message comprises an arrival time of a second malicious electronic message detected at the first source.

46. The computerized method of claim 34, wherein the first source is a network device that includes message analysis logic and the second source is a network device operating as a web-based security appliance.

47. A computerized method for malware detection conducted by a network device including processing circuitry and a data store, comprising:
  receiving a set of indicators of compromise (IOCs) from a first source, the set of IOCs identified as being caused by a known malware associated with a first message type;
  receiving one or more IOCs from a second source that is different from the first source where a cause of the one or more IOCs is unknown; and
  conducting a predictive analysis of the one or more IOCs received from the second source to determine whether the received IOCs from the second source correspond to the set of IOCs received from the first source,
  wherein information including an arrival time of a malicious electronic message detected at the first source is used to locate a second malicious electronic message of the first message type that is undetected at the second source and is the cause of the one or more IOCs at the second source.

48. The computerized method of claim 47, wherein the information associated with at least the set of IOCs that is used to locate the second malicious electronic message further comprises information associated with the one or more IOCs received from the second source that include one or more of (i) a geographical origin of the second source, (ii) a group membership of the second source, (iii) a company type of the second source, or (iv) a type of industry to which the second source belongs.

* * * * *